(12) United States Patent
Liu et al.

(10) Patent No.: US 9,794,261 B2
(45) Date of Patent: Oct. 17, 2017

(54) METHOD AND APPARATUS FOR CONTROLLING ACCESS TO A SERVER

(71) Applicant: Xiaomi Inc., Beijing (CN)

(72) Inventors: Tiejun Liu, Beijing (CN); Zheng Li, Beijing (CN); Xianlin Chen, Beijing (CN); Liang Cheng, Beijing (CN)

(73) Assignee: Xiaomi Inc., Beijing (CN)

( * ) Notice: Subject to any disclaimer, the term of this patent is extended or adjusted under 35 U.S.C. 154(b) by 446 days.

(21) Appl. No.: 14/505,684

(22) Filed: Oct. 3, 2014

(65) Prior Publication Data

US 2015/0281245 A1   Oct. 1, 2015

Related U.S. Application Data

(63) Continuation of application No. PCT/CN2014/082874, filed on Jul. 24, 2014.

(30) Foreign Application Priority Data

Mar. 28, 2014  (CN) .......................... 2014 1 0123103

(51) Int. Cl.
*G06F 15/173* (2006.01)
*H04L 29/06* (2006.01)
*H04L 29/12* (2006.01)

(52) U.S. Cl.
CPC .......... *H04L 63/101* (2013.01); *H04L 61/103* (2013.01); *H04L 61/6022* (2013.01)

(58) Field of Classification Search
CPC .. H04L 23/101; H04L 61/103; H04L 61/6022
USPC ....................................................... 709/225
See application file for complete search history.

(56) References Cited

U.S. PATENT DOCUMENTS

| 9,338,168 B2* | 5/2016 | Zhang .................. H04L 63/101 |
| 2007/0203979 A1 | 8/2007 | Walker et al. |
| 2009/0177971 A1 | 7/2009 | Kim et al. |
| 2011/0107436 A1 | 5/2011 | Cholas et al. |
| 2011/0296170 A1 | 12/2011 | Chen |
| 2012/0036557 A1 | 2/2012 | Li |

(Continued)

FOREIGN PATENT DOCUMENTS

| CA | 2 841 140 A1 | 6/2013 |
| CN | 1750462 A | 3/2006 |
| CN | 101371561 A | 2/2009 |

(Continued)

OTHER PUBLICATIONS

International Search Report of PCT/CN2014/082874, from the State Intellectual Property Office of China, mailed Jan. 5, 2015.

(Continued)

*Primary Examiner* — Wing F Chan
*Assistant Examiner* — Joseph Maniwang
(74) *Attorney, Agent, or Firm* — Finnegan, Henderson, Farabow, Garrett & Dunner LLP (57) ABSTRACT

A method for use in a Digital Living Network Alliance (DLNA) server, for controlling access to the DLNA server, includes: receiving an access request sent from a DLNA client to access the DLNA server; obtaining a media access control (MAC) address used by the DLNA client; detecting whether the MAC address exists in a preset blacklist; and denying access of the DLNA client, if the MAC address exists in the preset blacklist.

9 Claims, 5 Drawing Sheets

(56) References Cited

U.S. PATENT DOCUMENTS

2013/0055303 A1    2/2013    Kannan et al.

FOREIGN PATENT DOCUMENTS

| | | |
|---|---|---|
| CN | 101547187 A | 9/2009 |
| CN | 102510371 A | 6/2012 |
| CN | 102547684 A | 7/2012 |
| CN | 102665211 A | 9/2012 |
| CN | 103929419 A | 7/2014 |
| JP | 2005067174 A | 3/2006 |
| KR | 20060083273 A | 7/2006 |
| KR | 20110087594 A | 8/2011 |
| RU | 2497311 C2 | 10/2013 |
| WO | WO 2006/134476 A1 | 12/2006 |
| WO | WO 2012/151967 A1 | 11/2012 |
| WO | WO 2013/086836 A1 | 6/2013 |

OTHER PUBLICATIONS

Notice of Allowance for Korean Application No. 10-2014-7026649 mailed Mar. 3, 2016 and English translation thereof.

Extended Search Report for European Application No. 15151401.5 from the European Patent Office, dated Aug. 26, 2015.

English version of International Search Report of PCT Application No. PCT/CN2014/082874, mailed Jan. 5, 2015, Issued by the ISA/CN—State Intellectual Property Office of the P.R. China.

Office Action in counterpart Russian Application No. 2015134847/08(053469), dated Oct. 12, 2016 and English translation thereof.

\* cited by examiner

METHOD AND APPARATUS FOR CONTROLLING ACCESS TO A SERVER

CROSS REFERENCE TO RELATED APPLICATIONS

This application is a continuation of International Application No. PCT/CN2014/082874, filed Jul. 24, 2014, which is based upon and claims priority to Chinese Patent Application No. 201410123103.7, filed Mar. 28, 2014, the entire contents of all of which are incorporated herein by reference.

TECHNICAL FIELD

The present disclosure generally relates to the field of communication and, more particularly, to a method and an apparatus for controlling access to a server.

BACKGROUND

Digital Living Network Alliance (DLNA) is an organization for defining interoperability guidelines to enable sharing digital media contents among consumer electronic devices.

A conventional DLNA network architecture can include a DLNA client and a DLNA server, and the DLNA client is coupled with the DLNA server via a wired network or a wireless network. The DLNA server is configured to provide media contents, including providing a platform for sharing multimedia files. This platform supports sharing of media contents such as pictures, music, videos and so on. The DLNA client is configured to access and play the media contents shared by the DLNA server.

Conventionally, there is no management or control on the access of the DLNA client to the DLNA server, and the DLNA client may arbitrarily initiate an access request to the DLNA server, which may result in occurrence of malicious access and potential security risks.

SUMMARY

According to a first aspect of the present disclosure, there is provided a method for use in a Digital Living Network Alliance (DLNA) server, for controlling access to the DLNA server, comprising: receiving an access request sent from a DLNA client to access the DLNA server; obtaining a media access control (MAC) address used by the DLNA client; detecting whether the MAC address exists in a preset blacklist; and denying access of the DLNA client, if the MAC address exists in the preset blacklist.

According to a second aspect of the present disclosure, there is provided an apparatus for controlling access to a Digital Living Network Alliance (DLNA) server, comprising: a processor; and a memory for storing instructions executable by the processor; wherein the processor is configured to: receive an access request sent from a DLNA client to access the DLNA server; obtain a media access control (MAC) address used by the DLNA client; detect whether the MAC address exists in a preset blacklist; and deny an access of the DLNA client, if the MAC address exists in the preset blacklist.

According to a third aspect of the present disclosure, there is provided a non-transitory computer-readable storage medium having stored therein instructions that, when executed by a processor of an apparatus, cause the apparatus to perform a method for controlling access to a Digital Living Network Alliance (DLNA) server, the method comprising: receiving an access request sent from a DLNA client to access the DLNA server; obtaining a media access control (MAC) address used by the DLNA client; detecting whether the MAC address exists in a preset blacklist; and denying access of the DLNA client, if the MAC address exists in the preset blacklist.

It is to be understood that both the foregoing general description and the following detailed description are exemplary and explanatory only and are not restrictive of the invention, as claimed.

BRIEF DESCRIPTION OF THE DRAWINGS

The accompanying drawings, which are hereby incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

In exemplary embodiments, there is provided a method for controlling access to a server, such as a Digital Living Network Alliance (DLNA) server. The DLNA server is configured to realize sharing of media contents such as pictures, music, videos and so on. The DLNA server may be computer software for realizing the sharing of media contents, and may also be a computer or a computer system for executing the computer software.

When the DLNA server is computer software for realizing the sharing of media contents, such as pictures, music, videos and no on, the DLNA server may operate on a DLNA device. The DLNA device may be an intelligent router which has, in addition to routing functions provided by general routers, an independent operating system, on which a user may install various applications. The operating system may be a customized operating system based on OpenWrt. The DLNA device includes a storage medium, for example, a hard disk, which is configured to store files such as pictures, music, and videos. In one exemplary embodiment, the DLNA device further includes a universal serial bus (USB) interface which may support access of mobile storage devices, such as a USB flash driver or a mobile hard disk.

Figure 1:
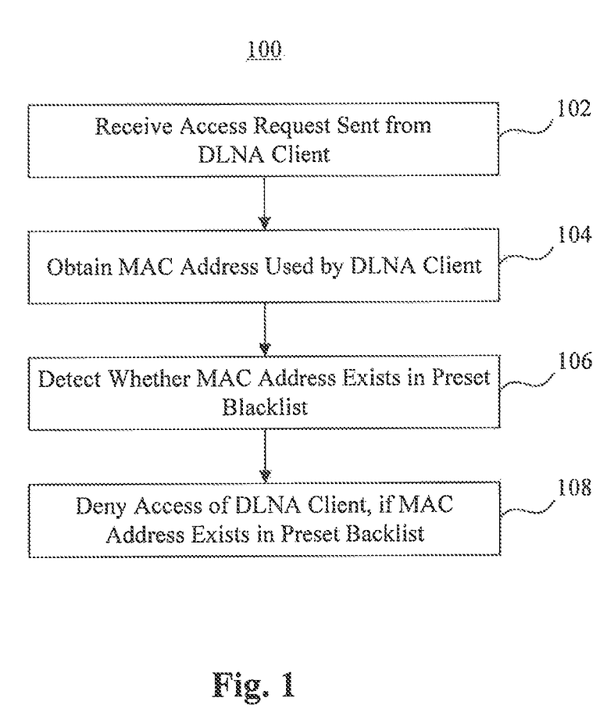
FIG. 1 is a flowchart of a method for controlling access to a server, according to an exemplary embodiment.

FIG. 1 is a flowchart of a method 100 for controlling access to a server, according to an exemplary embodiment. In the illustrated embodiment, the server is a DLNA server, but the method 100 is not limited thereto. Referring to FIG. 1, the method 100 includes the following steps.

In step 102, the DLNA server receives an access request sent from a DLNA client.

In step 104, the DLNA server obtains a media access control (MAC) address used by the DLNA client.

In step 106, the DLNA server detects whether the MAC address exists in a preset blacklist.

In step 108, the DLNA server denies access of the DLNA client if the MAC address exists in the preset blacklist.

The method 100 can overcome the problem that malicious access and potential security risks result from a DLNA client arbitrarily initiating an access request to a DLNA server. In the present embodiment, by setting a preset blacklist, access requests sent by a DLNA client from an illegal MAC address or from a MAC address not having an access right are effectively eliminated, thereby malicious access and potential security risks can be avoided.

Figure 2:
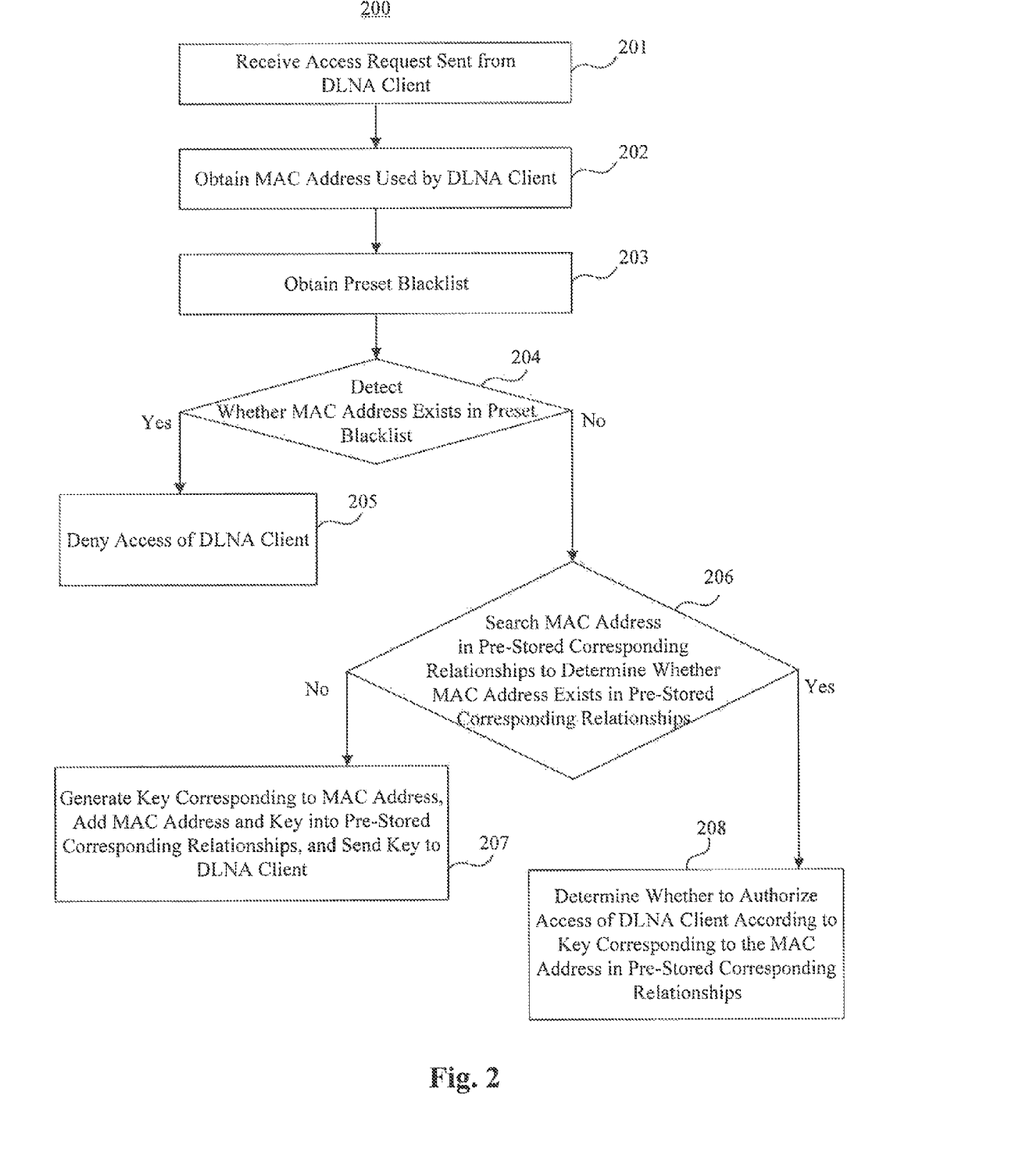
FIG. 2 is a flowchart of a method for controlling access to a server, according to an exemplary embodiment.

FIG. 2 is a flowchart of a method 200 for controlling access to a server, according to an exemplary embodiment. In the illustrated embodiment, the server is a DLNA server, but the method 200 is not limited thereto. Referring to FIG. 2, the method 200 includes the following steps.

In step 201, the DLNA server receives an access request sent from a DLNA client.

In exemplary embodiments, the DLNA client may be coupled with the DLNA server via a wired network or a wireless network. When the DLNA client needs to access files shared by the DLNA server, the DLNA client sends an access request to the DLNA server. Correspondingly, the DLNA server receives the access request sent from the DLNA client.

In step 202, the DLNA server obtains a media access control (MAC) address used by the DLNA client.

In exemplary embodiments, after receiving the access request, the DLNA server obtains the MAC address used by the DLNA client. For example, the DLNA server firstly obtains an Internet Protocol (IP) address of the DLNA client, and then performs a reverse query to identify a MAC address corresponding to the IP address based on an address resolution protocol (ARP), as the MAC address used by the DLNA client.

In exemplary embodiments, the IP address of the DLNA client may continuously change, but the MAC address generally does not change. Thus, in the present embodiments, the MAC address used by the DLNA client is used to determine whether to authorize the access of the DLNA client.

In step 203, the DLNA server obtains a preset blacklist.

In exemplary embodiments, the DLNA server obtains a preset blacklist including illegal MAC addresses and/or MAC addresses not having an access right. In one exemplary embodiment, the MAC addresses in the preset blacklist are managed by a user, for example, a network administrator, by amending, adding or removing MAC addresses in the preset blacklist. The user can view MAC addresses of DLNA clients which are coupled to the DLNA server. If the user does not want a DLNA client corresponding to a MAC address to have an access right, i.e., the user does not want the DLNA client to access files shared by the DLNA server, the user may add the MAC address of the DLNA client into the blacklist.

In one exemplary embodiment, the DLNA server operates as software on a DLNA device. The DLNA device may further include a server-type application, such as a Datacenter Server. The Datacenter Server includes first and second application programming interfaces (APIs). The first API is configured to obtain and display the MAC addresses of all of the DLNA clients which are currently coupled to the DLNA server, and the second API is configured to add a MAC address into the preset blacklist. When the user needs to add a certain MAC address into the preset blacklist, for example, the second API may be invoked by triggering corresponding instructions so as to realize addition of the certain MAC address into the preset blacklist.

In the above embodiments, the DLNA server and the Datacenter Server both operate in the DLNA device. Accordingly, the DLNA server may obtain the preset blacklist from the Datacenter Server.

In exemplary embodiments, step 203 may be performed before steps 201 and 202, or performed after steps 201 and 202, or performed simultaneously with step 201 or 202.

In step 204, the DLNA server detects whether the MAC address exists in the preset blacklist.

For example, after obtaining the MAC address of the DLNA client currently sending the access request and the preset blacklist, the DLNA server detects whether the MAC address exists in the preset blacklist.

In step 205, if the MAC address exists in the preset blacklist, the DLNA server denies access of the DLNA client.

In exemplary embodiments, if the MAC address exists in the preset blacklist, the DLNA server denies the access of the DLNA client. When the MAC address of the DLNA client sending the access request exists in the preset blacklist, it indicates that the MAC address is an illegal MAC address or a MAC address not having an access right. Thus, the DLNA server denies the access of the DLNA client to make the DLNA client not capable of accessing the shared files, and thereby security of files is improved.

In step 206, if the MAC address does not exist in the preset blacklist, the DLNA server searches for the MAC address in pre-stored corresponding relationships to determine if the MAC address exists in the pre-stored corresponding relationships.

In exemplary embodiments, if the MAC address does not exist in the preset blacklist, the DLNA server searches for the MAC address, by which the current access request is sent, in the pre-stored corresponding relationships to determine whether the MAC address exists in the pre-stored corresponding relationships. The pre-stored corresponding relationships include corresponding relationships between different MAC addresses and different keys, and the MAC addresses in the pre-stored corresponding relationships are MAC addresses of DLNA clients which have ever successfully established an access connection with the DLNA server.

In order to prevent a DLNA client from obtaining an access right by ARP cheating, in the present embodiment, the pre-stored corresponding relationships are provided in the DLNA server. ARP cheating refers to a DLNA client counterfeiting its actual MAC address into a fake MAC address by means of counterfeiting a MAC address so as to cheat a DLNA server. For example, an actual MAC address of a DLNA client is A, which is in the preset blacklist. In order to obtain an access right, the DLNA client counterfeits a fake MAC address B, which is not in the blacklist. Under such condition, after receiving an access request sent from the DLNA client, the DLNA server will search and obtain the fake MAC address B, and thus the access request sent from the DLNA client may not be effectively denied.

In exemplary embodiments, the DLNA server provides a corresponding key for a MAC address of each DLNA client which has successfully established an access connection with the DLNA server. For example, when a DLNA client establishes an access connection with the DLNA server for the first time, that is, when the DLNA server authorizes an access request sent from the DLNA client for the first time, the DLNA server generates a key corresponding to a MAC address of the DLNA client, and adds a corresponding relationship between the MAC address and the key into the pre-stored corresponding relationships.

The DLNA server also sends the key to the DLNA client corresponding to the MAC address, and requests the DLNA client to carry the key in subsequent access requests. Otherwise, the DLNA client will not obtain an access right. In a subsequent access request, the DLNA server may determine whether to authorize access of the DLNA client by judging whether the key is carried in the access request. Thus, a DLNA client is prevented from obtaining an access right by ARP cheating.

In some embodiments, if the MAC address is not in the preset blacklist, the DLNA server may directly perform authorizing access of the DLNA client.

In step 207, lithe MAC address does not exist in the pre-stored corresponding relationships, the DLNA server generates a key corresponding to the MAC address, adds the MAC address and the key corresponding to the MAC address into the pre-stored corresponding relationships, and sends the key to the DLNA client corresponding to the MAC address.

In exemplary embodiments, lithe MAC address does not exist in the pre-stored corresponding relationships, it indicates that the DLNA client is a client which sends the access request for the first time. Since it has been verified in step 204 that the MAC address used by the DLNA client is not in the preset blacklist, the DLNA server may authorize the access of the DLNA client under such condition and thereby establish an access connection.

In addition, the DLNA server generates the key corresponding to the MAC address, adds the MAC address and the key corresponding to the MAC address into the pre-stored corresponding relationships, and sends the key to the DLNA client corresponding to the MAC address. For example, the DLNA server may send an authorization response to the DLNA client, and the authorization response can carry the generated key.

In step 208, if the MAC address exists in the pre-stored corresponding relationships, the DLNA server determines whether to authorize the access of the DLNA client according to the key corresponding to the MAC address included in the pre-stored corresponding relationships.

For example, if the MAC address exists in the pre-stored corresponding relationships, it indicates that the DLNA client previously successfully established an access connection with the DLNA server. Accordingly, the MAC address has been stored in the pre-stored corresponding relationships and has a corresponding key. Thus, the DLNA server may determine whether to authorize the access of the DLNA client according to the key corresponding to the MAC address included in the pre-stored corresponding relationships.

In exemplary embodiments, step 208 may include the following sub-steps.

Firstly, the key corresponding to the MAC address is obtained according to the pre-stored corresponding relationships.

For example, since the corresponding relationships between keys and MAC addresses of the DLNA clients which have ever successfully established an access connection with the DLNA server are stored in the pre-stored corresponding relationships, when the MAC address of the DLNA client currently sending the access request is in the pre-stored corresponding relationships, the DLNA server obtains the key corresponding to the MAC address from the pre-stored corresponding relationships.

Secondly, it is judged whether a key is carried in the access request sent from the DLNA client.

For example, the DLNA server requests the DLNA client which has ever successfully established an access connection with the DLNA server to carry a key in subsequent access requests. Since the DLNA server has already determined that the DLNA client has previously successfully established an access connection with the DLNA server, the DLNA server judges whether the access request currently sent from the DLNA client carries the key.

Thirdly, if a key is carried in the access request, and the carried key matches the key corresponding to the MAC address, the access of the DLNA client is authorized.

For example, if a key is carried in the access request, and the carried key and the key corresponding to the MAC address are the same, it indicates that the DLNA client established the first access connection not by ARP cheating and the DLNA client successfully received the key fed back by the DLNA server at that time. Under such condition, the DLNA server authorizes the access of the DLNA client and establishes an access connection with the DLNA client.

Fourthly, if no key is carried in the access request, or the carried key does not match the key corresponding to the MAC address, the access of the DLNA client is denied.

For example, if no key is carried in the access request, or the carried key is different from the key corresponding to the MAC address, it indicates that the DLNA client established the first access connection by ARP cheating and the DLNA client did not receive the key fed back by the DLNA server at that time. Under such condition, the DLNA server denies the current access of the DLNA client.

The method 200 can overcome the problem in related technologies that malicious access and potential security risks result from a DLNA client arbitrarily initiating an access request to a DLNA server. In the present embodiment, by setting a preset blacklist, access requests sent by a DLNA client from an illegal MAC address or from a MAC address not having an access right are effectively eliminated, thereby malicious access and potential security risks can be avoided.

Furthermore, in the present embodiment, a corresponding key is provided for a MAC address of each DLNA client which has successfully established an access connection with the DLNA server, and a corresponding relationship between the MAC address and the key is added into pre-stored corresponding relationships. In addition, the key is sent to the DLNA client corresponding to the MAC address, and the DLNA client is requested to include the key in subsequent access requests. Thus, a DLNA client can be prevented from obtaining an access right by ARP cheating, and thereby the security of the DLNA server may be further improved.

Figure 3:
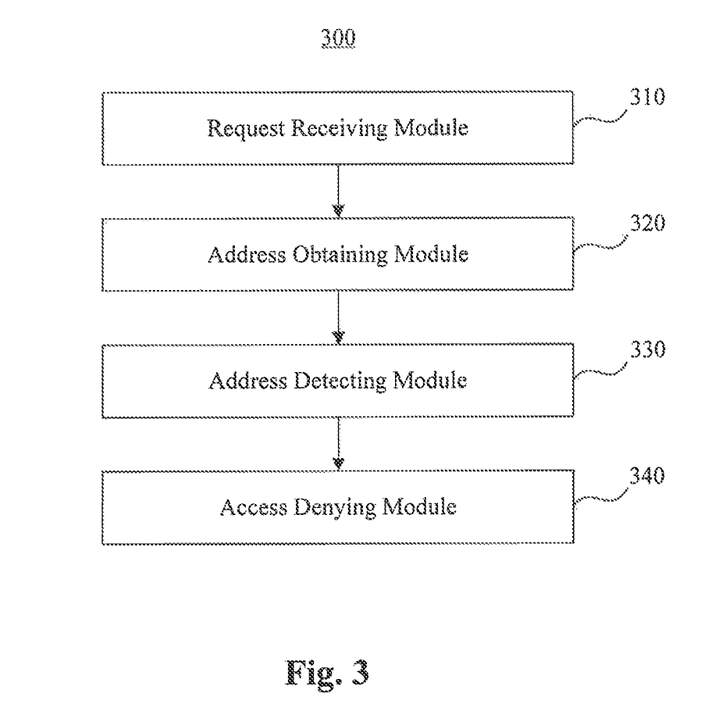
FIG. 3 is a block diagram of an apparatus for controlling access to a server, according to an exemplary embodiment.

FIG. 3 is a block diagram of an apparatus 300 for controlling access to a server, such as a DLNA server, according to an exemplary embodiment. The apparatus 300 can be implemented as a part or the whole of the DLNA server by software, hardware, or a combination thereof. Referring to FIG. 3, the apparatus 300 includes a request receiving module 310, an address obtaining module 320, an address detecting module 330, and an access denying module 340.

The request receiving module 310 is configured to receive an access request sent from a DLNA client.

The address obtaining module 320 is configured to obtain a media access control (MAC) address used by the DLNA client.

The address detecting module 330 is configured to detect whether the MAC address exists in a preset blacklist.

The access denying module 340 is configured to deny access of the DLNA client, if the MAC address exists in the preset blacklist.

The apparatus 300 can overcome the problem in related technologies that malicious access and potential security risks result from a DLNA client arbitrarily initiating an access request to a DLNA server. In the present embodiment, by setting a preset blacklist, access requests sent by a DLNA client from an illegal MAC address or from a MAC address not having an access right are effectively eliminated, thereby malicious access and potential security risks can be avoided.

Figure 4:
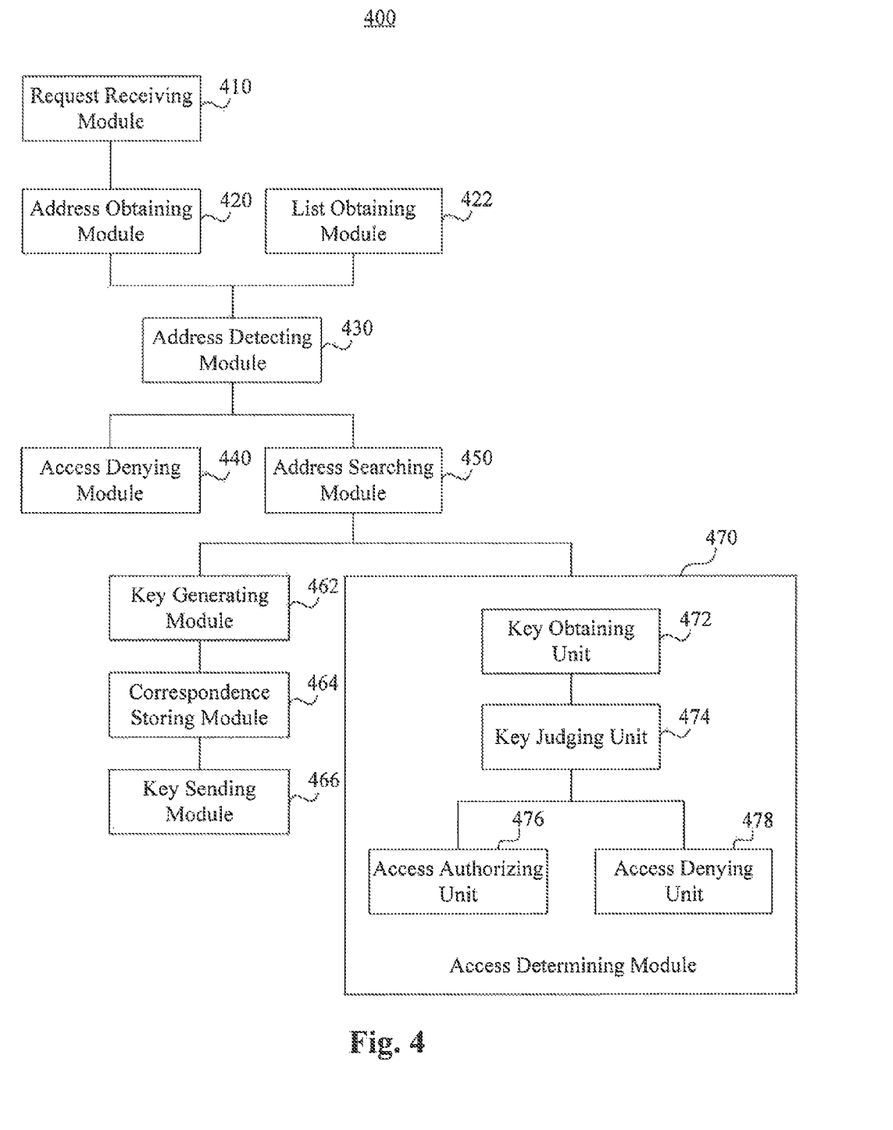
FIG. 4 is a block diagram of an apparatus for controlling access to a server, according to an exemplary embodiment.

FIG. 4 is a block diagram of an apparatus 400 for controlling access to a server, such as a DLNA server, according to an exemplary embodiment. The apparatus 400 can be implemented as a part or the whole of the DLNA server by software, hardware, or a combination thereof. Referring to FIG. 4, the apparatus for controlling access may include a request receiving module 410, an address obtaining module 420, an address detecting module 430, and an access denying module 440.

The request receiving module 410 is configured to receive an access request sent from a DLNA client.

The address obtaining module 420 is configured to obtain a media access control (MAC) address used by the DLNA client.

The address detecting module 430 is configured to detect whether the MAC address exists in a preset blacklist.

The access denying module 440 is configured to deny an access of the DLNA client, if the MAC address exists in the preset blacklist.

In exemplary embodiments, the apparatus 400 further includes a list obtaining module 422 configured to obtain the preset blacklist, which includes illegal MAC addresses and/or MAC addresses not having an access right to the DLNA server.

In exemplary embodiments, the apparatus 400 further includes an address searching module 450 configured to search for the MAC address in pre-stored corresponding relationships to determine whether the MAC address exists in the pre-stored corresponding relationships, if the MAC address does not exist in the preset blacklist, the pre-stored corresponding relationships including corresponding relationships between different MAC addresses and different keys.

In exemplary embodiments, the apparatus 400 further includes a key generating module 462 configured to generate a key corresponding to the MAC address used by the DLNA client, if the MAC address does not exist in the pre-stored corresponding relationships; a correspondence storing module 464 configured to add the MAC address and the key corresponding to the MAC address into the pre-stored corresponding relationships, and a key sending module 466 configured to send the key to the DLNA client corresponding to the MAC address.

In exemplary embodiments, the apparatus 400 also includes an access determining module 470 configured to determine whether to authorize the access of the DLNA client according to a key corresponding to the MAC address included in the pre-stored corresponding relationships, if the MAC address exists in the pre-stored corresponding relationships. The access determining module 470 includes a key obtaining unit 472, a key judging unit 474, an access authorizing unit 476, and an access denying unit 478.

The key obtaining unit 472 is configured to obtain the key corresponding to the MAC address according to the pre-stored corresponding relationships.

The key judging unit 474 is configured to judge whether a key is carried in the access request sent from the DLNA client.

The access authorizing unit 476 is configured to authorize the access of the DLNA client if a key is carried in the access request and the carried key matches the key corresponding to the MAC address.

The access denying unit 478 is configured to deny the access of the DLNA client if no key is carried in the access request or the carried key does not match the obtained key corresponding to the MAC address.

The apparatus 400 can overcome the problem in related technologies that malicious access and potential security risks result from a DLNA client arbitrarily initiating an access request to a DLNA server. In the present embodiment, by setting a preset blacklist, access requests sent by a DLNA client from an illegal MAC address or from a MAC address not having an access right are effectively eliminated, thereby malicious access and potential security risks can be avoided.

Furthermore, in the present embodiment, a corresponding key is provided for an MAC address of each DLNA client which has successfully established an access connection with the DLNA server, and a relationship between the MAC address and the key is added into pre-stored corresponding relationships. In addition, the key is sent to the DLNA client corresponding to the MAC address, and the DLNA client is requested to include the key in subsequent access requests. Thus, a DLNA client is prevented from obtaining an access right by ARP cheating, and thereby the security of the DLNA server may be further improved.

In exemplary embodiments, there is provided an apparatus for controlling access to a server, such as a DLNA server. The apparatus includes one or more processors; a memory; and one or more modules stored in the memory and being configured to be executed by the one or more processors. The one or more modules are configured to perform: receiving an access request sent from a DLNA client; obtaining a MAC address used by the DLNA client; detecting whether the MAC address exists in a preset blacklist; and denying an access of the DLNA client, if the MAC address exists in the preset blacklist.

In exemplary embodiments, there is provided a non-transitory computer-readable storage medium having stored therein instructions that, when executed by one or more processors of an apparatus, cause the apparatus to perform: receiving an access request sent from a DLNA client; obtaining a MAC address used by the DLNA client; detecting whether the MAC address exists in a preset blacklist; and denying an access of the DLNA client, if the MAC address exists in the preset blacklist.

Figure 5:
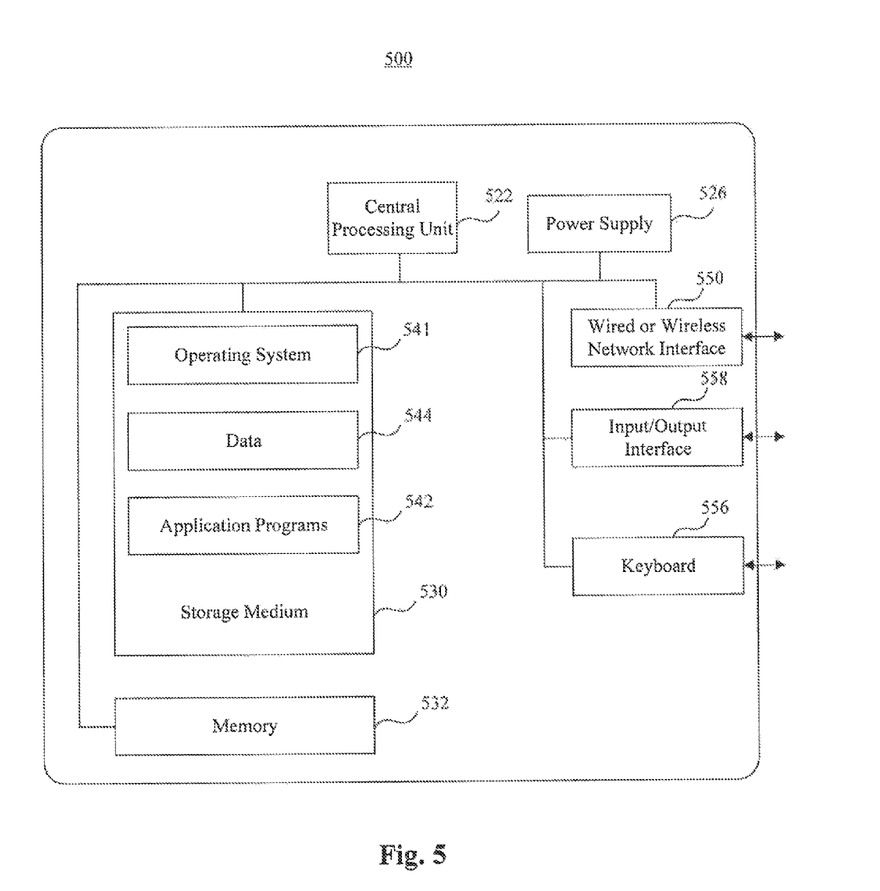
FIG. 5 is a block diagram of an apparatus for controlling access to a server, according to an exemplary embodiment.

FIG. 5 is a block diagram of an apparatus 500 for controlling access to a server, such as a DLNA server, according to an exemplary embodiment. For example, the apparatus 500 may be a part or the whole of the DLNA server. The apparatus 500 may include a central processing unit (CPU) 522 including one or more processors, a memory 532, and a storage medium 530, such as one or more mass storage devices, for storing an operating system 541, application programs 542, and/or data 544. The memory 532 and the storage medium 530 may perform temporary storage or permanent storage. Instructions stored in the storage medium 530 may include one or more modules, and each module may include a series of instruction operations for the apparatus 500. Further, the CPU 522 is configured to communicate with the storage medium 530, and to perform on the apparatus 500 a series of instruction operations in the storage medium 530.

The apparatus 500 may further include a power supply 526, a wired or wireless network interface 550, an input/output interface 558, and a keyboard 556. In addition, the operating systems 541 may be, e.g., Windows Server™, Mac OS X™, Unix™, Linux™, FreeBSD™, and the like.

When the instructions in the storage medium 530 are executed by the CPU 522 in the apparatus 500, the apparatus 500 may be caused to perform the above described methods for controlling access to a server.

In exemplary embodiments, there is also provided a non-transitory readable storage medium including instructions, such as included in the memory 530, executable by the CPU 522 in the apparatus 500, for performing the above-described methods for controlling access to a server.

One of ordinary skill in the art will understand that the above described modules/units can each be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to one of ordinary skill in the art from consideration of the specification and practice of the invention disclosed herein. This application is intended to cover any variations, uses, or adaptations of the invention following the general principles the of and including such departures from the present disclosure as come within known or customary practice in the art. It is intended that the specification and embodiments be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof, it is intended that the scope of the invention only be limited by the appended claims.

What is claimed is:

1. A method for use in a Digital Living Network Afliance (DLNA) server, for controlling access to the DLNA server, comprising:
receiving an access request sent from a DLNA client to access the DLNA server;
obtaining a media access control (MAC) address used by the DLNA client;
detecting whether the MAC address exists in a preset blacklist;
denying access of the DLNA client, if the MAC address exists in the preset blacklist;
searching for the MAC address in pre-stored corresponding relationships to determine whether the MAC address exists in the pre-stored corresponding relationships, if the MAC address does not exist in the preset blacklist, the pre-stored corresponding relationships including corresponding relationships between different MAC addresses and different keys; and
determining, if the MAC address exists in the pre-stored corresponding relationships, whether to authorize the accesss of the DLNA client according to a key corresponding to the MAC address in the pre-stored corresponding relationships.

2. The method according to claim 1, wherein the determining whether to authorize the access of the DLNA client comprises:
obtaining the key corresponding to the MAC address according to the pre-stored corresponding relationships;
judging whether a key is carried in the access request sent from the DLNA client;
authorizing the access of the DLNA client, if a key is carried in the access request and the carried key matches the obtained key corresponding to the MAC address; and
denying the access of the DLNA client, if no key is carried in the access request or the carried key does not match the obtained key corresponding to the MAC address.

3. The method according to claim 1, further comprising:
generating a key corresponding to the MAC address, if the MAC address does not exist in the pre-stored corresponding relationships;
adding the MAC address and the key corresponding to the MAC address into the pre-stored corresponding relationships; and
sending the key to the DLNA client.

4. The method according to claim 1, further comprising:
obtaining the preset blacklist, the obtained preset blacklist including at least one of an illegal MAC address or a MAC address not having an access right to the DLNA server.

5. An apparatus for controlling access to a Digital Living Network Alliance (DLNA) server, comprising:
a processor; and
a memory for storing instructions executable by the processor;
wherein the processor is configured to:
receive an access request sent from a DLNA client to access the DLNA server;
obtain a media access control (MAC) address used by the DLNA client;
detect whether the MAC address exists in a preset blacklist; and
deny an access of the DLNA client, if the MAC address exists in the preset blacklist;
search for the MAC address in pre-stored corresponding relationships to determine whether the MAC address exists in the pre-stored corresponding relationships, if the MAC address does not exist in the preset blacklist, the pre-stored corresponding relationships including corresponding relationships between different MAC addresses and different keys; and
determine whether to authorize the access of the DLNA client according to a key corresponding to the MAC address in the pre-stored corresponding relationships, if the MAC address exists in the pre-stored corresponding relationships.

6. The apparatus according to claim 5, wherein the processor is further configured to:
obtain the key corresponding to the MAC address according to the pre-stored corresponding relationships;
judge whether a key is carried in the access request sent from the DLNA client;
authorize the access of the DLNA client, if a key is carried in the access request and the carried key matches the obtained key corresponding to the MAC address; and deny the access of the DLNA client, if no key is carried in the access request or the carried key does not match the obtained key corresponding to the MAC address.

7. The apparatus according to claim 5, wherein the processor is further configured to:
   generate a key corresponding to the MAC address, if the MAC address does not exist in the pre-stored corresponding relationships;
   add the MAC address and the key corresponding to the MAC address into the pre-stored corresponding relationships; and
   send the key to the DLNA client.

8. The apparatus according to claim 5, wherein the processor is further configured to:
   obtain the preset blacklist, the obtained preset blacklist including at least one of an illegal MAC address or a MAC address not having an access right to the DLNA server.

9. A non-transitory computer-readable storage medium having stored therein instructions that, when executed by a processor of an apparatus, cause the apparatus to perform a method for controlling access to a Digital Living Network Alliance (DLNA) server, the method comprising:
   receiving an access request sent from a DLNA client to access the DLNA server;
   obtaining a media access control (MAC) address used by the DLNA client;
   detecting whether the MAC address exists in a preset blacklist; and
   denying access of the DLNA client, if the MAC address exists in the preset blacklist;
   searching for the MAC address in pre-stored corresponding relationships to determine whether the MAC address exists in the pre-stored corresponding relationships, if the MAC address does not exist in the preset blacklist, the pre-stored corresponding relationships including corresponding relationships between different MAC addresses and different keys; and
   determining, if the MAC address exists in the pre-stored corresponding relationships, whether to authorize the access of the DLNA client according to a key corresponding to the MAC address in the pre-stored corresponding relationship.

* * * * *

UNITED STATES PATENT AND TRADEMARK OFFICE
CERTIFICATE OF CORRECTION

PATENT NO. : 9,794,261 B2  
APPLICATION NO. : 14/505684  
DATED : October 17, 2017  
INVENTOR(S) : Tiejun Liu et al.

Page 1 of 1

It is certified that error appears in the above-identified patent and that said Letters Patent is hereby corrected as shown below:

In the Claims

Column 12, Lines 20-21, "pre-stored corresponding relationship" should read -- pre-stored corresponding relationships --.

Signed and Sealed this  
Eighth Day of October, 2019

Andrei Iancu  
*Director of the United States Patent and Trademark Office*